(12) United States Patent
Austin

(10) Patent No.: US 6,470,139 B2
(45) Date of Patent: Oct. 22, 2002

(54) DATA TRANSFER SYSTEM FOR TRANSFERRING DATA FROM A COMPUTER TO A TAPE DEVICE

(75) Inventor: Julie Austin, Northwich (GB)

(73) Assignee: Danmere Limited, Cheshire (GB)

( * ) Notice: Subject to any disclaimer, the term of this patent is extended or adjusted under 35 U.S.C. 154(b) by 0 days.

(21) Appl. No.: 08/973,869

(22) PCT Filed: Jul. 8, 1996

(86) PCT No.: PCT/GB96/01678

§ 371 (c)(1),
(2), (4) Date: Mar. 6, 1998

(87) PCT Pub. No.: WO97/03441

PCT Pub. Date: Jan. 30, 1997

(65) Prior Publication Data

US 2002/0131758 A1 Sep. 19, 2002

(30) Foreign Application Priority Data

Jul. 7, 1995 (GB) .............................................. 9513891

(51) Int. Cl.[7] .................................................. H04N 5/91
(52) U.S. Cl. ............................. 386/95; 386/46; 386/124
(58) Field of Search ................................ 386/2, 21, 46, 386/47, 95, 100, 124; 360/44–45; H04N 5/91

(56) References Cited

U.S. PATENT DOCUMENTS

| | | | | |
|---|---|---|---|---|
| 4,306,305 A | * | 12/1981 | Doi et al. ...................... | 371/38 |
| 4,380,047 A | * | 4/1983 | Eisenhard et al. ........... | 364/200 |
| 4,467,373 A | * | 8/1984 | Taylor et al. ............... | 360/38.1 |
| 4,635,141 A | * | 1/1987 | Coulter ......................... | 360/44 |
| 4,652,944 A | * | 3/1987 | Tindall ....................... | 360/37.1 |
| 4,839,745 A | * | 6/1989 | Tindall ........................ | 358/336 |
| 5,729,282 A | * | 3/1998 | Okawa ......................... | 348/423 |

FOREIGN PATENT DOCUMENTS

| | | | | |
|---|---|---|---|---|
| EP | 0243020 A2 | * | 10/1987 | ............. G06F/3/06 |
| GB | 2059713 A | * | 4/1981 | ............ H04N/5/76 |

\* cited by examiner

*Primary Examiner*—Vincent Boccio
(74) *Attorney, Agent, or Firm*—Arent Fox Kintner Plotkin & Kahn, PLLC

(57) ABSTRACT

A data transfer system for transferring data between a computer and a video recorder/player is disclosed. Generating means generate a video signal. Coding means code data received from a computer. Mixing means mix the coded data with the video signal to carry the data on the video signal. Furthermore, separating means separate coded data from a video signal received from a video recorder/player. Decoding means decode data separated by the separating means. Settable timing means control the rate of transfer of data between the computer and the video recorder/player. A predetermined number of data bits carried on the video signal are carried on each of a plurality of lines of the video signal. Each line carries markers to define the beginning and end of the line and when the video signal is decoded, missing data bits on a line are replaced by a predetermined sequence of bits, and each such sequence of bits is detected by an error detector and reconstituted by the original bits by an error correction process.

12 Claims, 18 Drawing Sheets

Fig.18

| Line start Indent | Data & RS codes | Parity | Line count & end indent |
|---|---|---|---|
| 01010 | 10101011,11010010,00010101,00...... | 11010 | 000001 |
| 01010 | 10000011,11000010,11010101,00...... | 10110 | 000010 |
| 01010 | 10111111..... | | |
| ... | ... | ... | ... |
| | 10000011,11000010,11010101,00...... | 10110 | 000111 |
| 01010 | 10111111,11000000,01110101,01...... | 10011 | 001000 |

DATA TRANSFER SYSTEM FOR TRANSFERRING DATA FROM A COMPUTER TO A TAPE DEVICE

BACKGROUND OF INVENTION

This invention relates to data backup, and is concerned particularly although not exclusively with the backup of data from a computer onto a tape.

Personal computers (PCs) are increasingly used in a wide range of applications. Such is the widespread use of personal computers that many homes are now equipped with a personal computer for word processing, managing personal finances, playing games, education and work related topics. This has inevitably required computers to hold large amounts of information and programs. Early machines had limited hard disk capacity, typically 50 megabytes or less. However, hard disk capacities of 500 megabytes are commonplace for newer machines. This poses a problem for the owner of either the old or new type of machine. The problem with the old machine is how to store more data, and for the new machine how to ensure that data is not lost. The hard disk is one of only a few mechanical components within a modern computer, and as such it is susceptible to wear which can cause data errors. An additional problem is that of software viruses that attack data structures with the outcome being data loss.

One solution to both problems is to use a tape backup unit. This would allow important files to be duplicated so as to ensure that a copy can be held in a safe place. Also, less frequently used files could be archived onto tape, which would free valuable disk space for additional files. Such tape backup disks exist, but are too expensive for many home users. A more economical method of data backup is required.

Most homes are equipped with video recorder equipment. Video recorders have been available for some time and are available in many different forms with varied signal characteristics. These machines were designed to record picture information which by its nature can accommodate many errors that would not be perceptible to a viewer. A video recorder can be used to store information other than pictures. However the information must first be converted into a form that the recorder accepts, a video signal.

It is possible to produce an interface for connecting a video recorder to a PC. Such a system would allow the user to back up information, thereby guarding against loss and allowing space to be freed up for storage of new information. Systems of this type have been proposed. However, they tend to be expensive and suffer from poor performance, due to varying capabilities of video recorders and tape media, and varying degrees of wear in video mechanisms.

The widespread use of inexpensive video backup systems has been limited by the varied specification of PCs relating to disk capacity, disk I/O bandwidth, system memory and processor speed, compounded by the varying capability of a domestic video recorder in terms of bandwidth and errors.

SUMMARY OF THE INVENTION

Preferred embodiments of the present invention aim to provide improved systems that can overcome the vagaries of differing PC specifications and video recorder capabilities. Another aim of preferred embodiments of this invention is to provide a programmable system that can be switched between several configurations.

Preferred embodiments of the invention aim to calculate the best possible conditions for each machine/tape combination and automatically modify a data rate, error correction and/or coding scheme accordingly. A further aim is to be able to compensate for differing PC specifications, by arranging data into frames whereby missing data can be identified and replaced with dummy data which is subsequently passed to an error correction process. A further aim is to divide the task of data encoding/decoding and error correction between a PC microprocessor and the data processing capabilities of an interface card, in order to achieve the lowest cost implementation of the back up system. A further aim is to provide the user with information allowing rapid identification and recovery of selected files.

More generally, according to one aspect of the present invention, there is provided a data transfer system for transferring data between a computer and a video recorder/player, the system comprising:

generating means for generating a video signal;

coding means for coding data received from a computer;

mixing means for mixing such coded data with said video signal to carry said data on said video signal;

separating means for separating coded data from a video signal received from a video recorder/player;

decoding means for decoding data separated by said separating means; and settable timing means for controlling the rate of transfer of data between a computer and a video recorder/player.

Preferably, at least part of said generating means, coding means, mixing means, separating means, decoding means and timing means are embodied as an interface device for cooperation with a computer.

Preferably, said interface device comprises a PC expansion card.

A system as above may include first ranging means for assessing data transfer rate and associated error characteristics of a video recorder/player, and providing a control signal or data to said timing means.

A system as above may include second ranging means for assessing data transfer rate and associated error characteristics of a computer, and providing a control signal or data to said timing means.

Preferably, said second ranging means is arranged to assess CPU performance, available static memory, disk capacity and disk I/O bandwidth of a computer.

Preferably, at least part of said first and/or second ranging means is embodied by way of a program within said computer.

Preferably, for the data carried on said video signal, a predetermined number of data bits are carried on each of a plurality of lines of the video signal; each line carries markers to define the beginning and end of the line; and when decoding the video signal, missing data bits on a line are replaced by a predetermined sequence of bits, and each said sequence of bits is detected by an error detector and reconstituted by the original bits by an error correction process.

Preferably, said predetermined sequence of bits comprises a string of zero's or a string of one's.

Preferably, said decoding means comprises a counter which is reset by each transition edge of incoming data and provides a count signal after one-half of the duration of one data bit and thereafter at a period equal to the duration of one bit until being reset, the count signal being used to detect a current data bit.

A system as above may include means for generating a display signal to display identification data of a current file of which the data is being transferred between a computer and a video recorder/player.

In use, the data of such a display signal is preferably visible when playing back a tape via a TV or monitor connected to the video recorder/player.

The invention extends to a combination of a computer and/or a video recorder/player together with a data transfer system according to any of the preceding aspects of the invention.

Preferably, the data transfer system is arranged to back up data from a hard disk of the computer to the video recorder/player, and to restore data from the video recorder/player to the hard disk of the computer.

For a better understanding of the invention, and to show how embodiments of the same may be carried into effect, reference will now be made, by way of example, to the accompanying diagrammatic drawings, in which:

BRIEF DESCRIPTION OF THE DRAWING(S)

FIG. 18 illustrates an example of line code sequences.

DETAILED DESCRIPTION OF THE INVENTION

Figure 1:
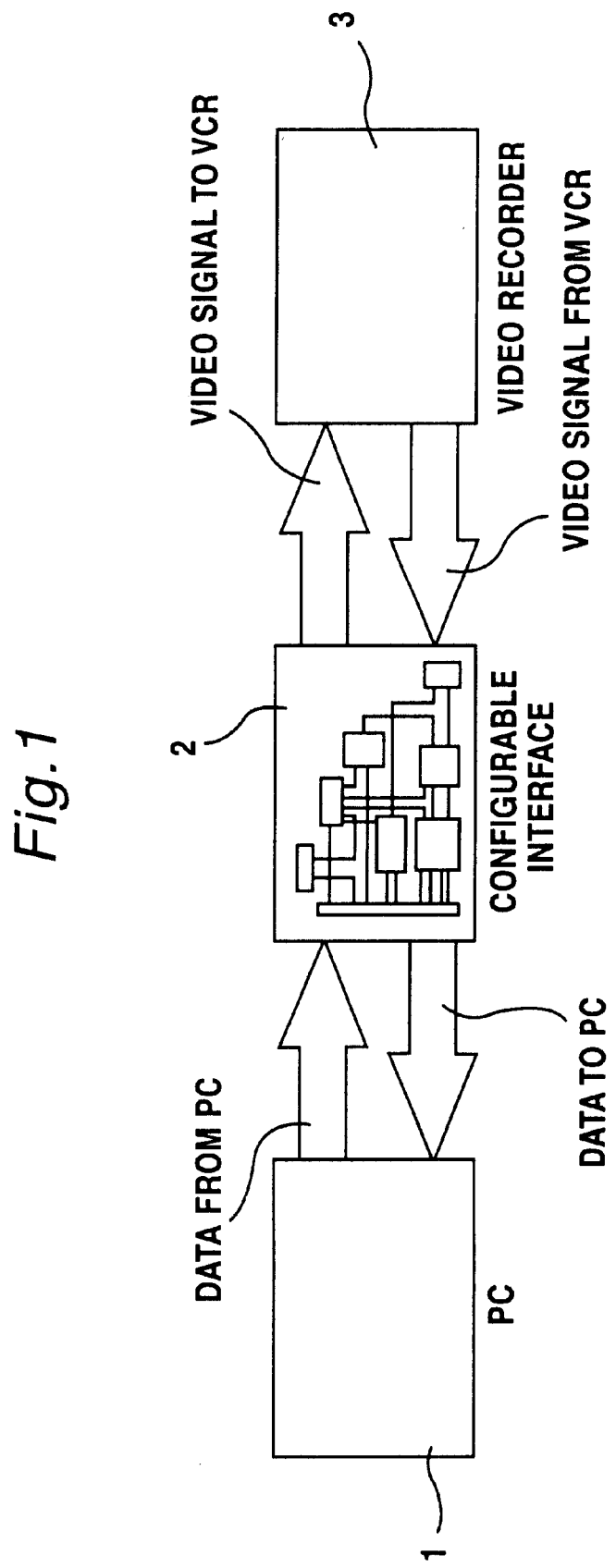
FIG. 1 is a schematic diagram of data backup system comprising a video interface card connected between a PC and a video recorder.

The data backup system that is shown in FIG. 1 comprises a PC 1 which is provided with a video interfaced card 2, which in turn is connected to a video cassette recorder (VCR) 3. Data from the PC passes through the interface 2 to the VCR 3, where it is recorded on tape (or other recording medium). Data replayed from the tape passes from the VCR 3 to the interface 2, and from there into the PC 1.

Figure 2:
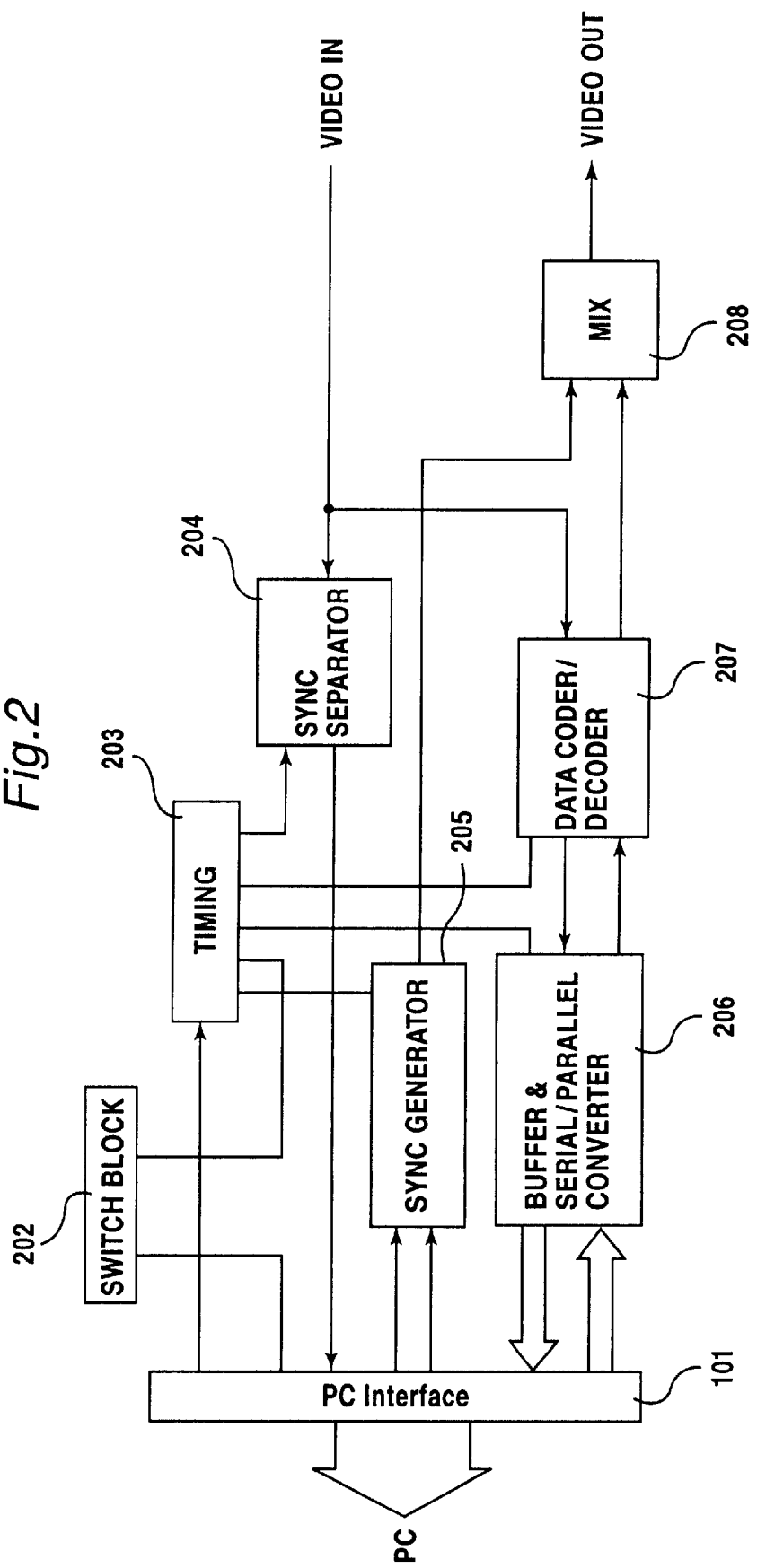
FIG. 2 is a functional block diagram of the interface card.

The interface 2 is shown in more detail in FIG. 2. At one end, it connects with a PC interface 101, which makes all of the necessary connections to the PC 1. Connected to the PC interface 101 are a switch block 202, a timing circuit 203, a sync separator 204, a sync generator 205 and a buffer and serial/parallel converter 206. A data coder/decoder 207 is connected to the timing circuit 203, the sync separator 204 and the buffer and serial/parallel converter 206. A mixer 208 is connected to receive signals from the sync generator 205 and the data coder/decoder 207, and to supply a video out signal to the video recorder 3. The sync separator 204 is arranged to receive a video in signal from the video recorder 3.

Figure 3:
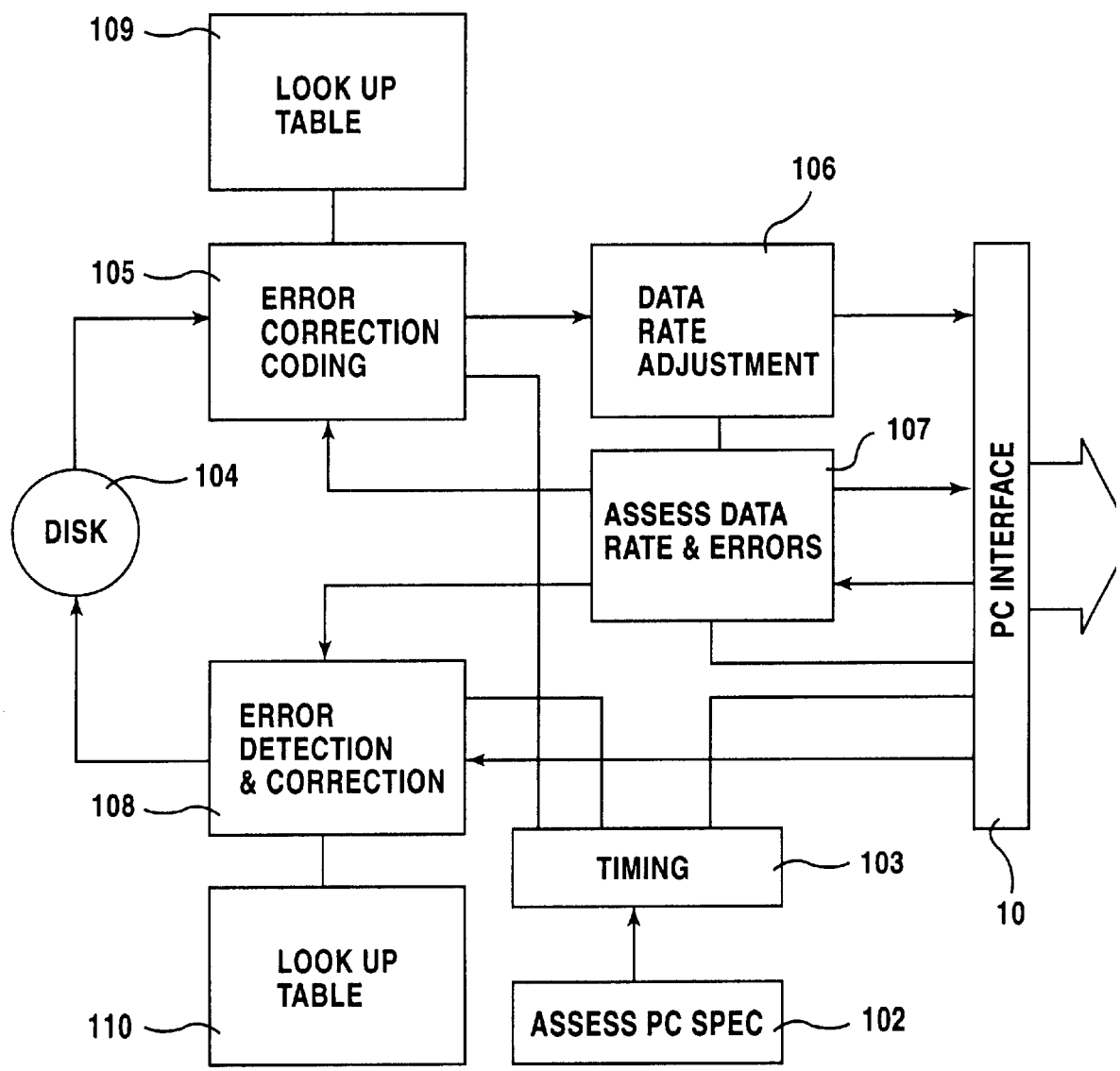
FIG. 3 is a functional block diagram to illustrate operation of the PC.

The block diagram of FIG. 3 illustrates functions that are performed by the PC, in co-operation with the video interface 2. Briefly, under the control of a program, the specification of the PC is assessed in step 102, and the results of the assessment are used in a timing step 103. Alternatively, the user can directly set the timing parameters via the computer keyboard. Data from a disk 104 of the PC is subject to error correction coding in step 105. The error correction coding step is programmable to enable different error rates to be accommodated. Programming is controlled by a step 107 or by user set parameters. After a data rate adjustment step 106, data is fed to the VCR 3, via the PC interface 101 and the video interface 2. The data is read back from the VCR 3, and the data and error rates are assessed in step 107 or by user entered parameters, in response to which the data rate is adjusted in step 106.

Data received from the VCR 3 via the video interface 2 and PC interface 101 is fed to the disk 104, after an error detection and correction step 108. Both error correction and error detection can be carried out with reference to respective look up tables 109, 110.

In summary, the rate of transfer of data between the PC and the VCR via the video interface 2 can be set in accordance with the characteristics of both the PC and the VCR, to achieve the maximum acceptable transfer rate, the characteristics being determined in the steps as mentioned above.

The video recorder/player can be readily characterised by recording a test pattern that incorporates data transfer utilising data lines set to different transfer rates and differing error correction codes. During playback, the lines that pass framing and error correction processes will define suitable operating parameters.

Figure 4:
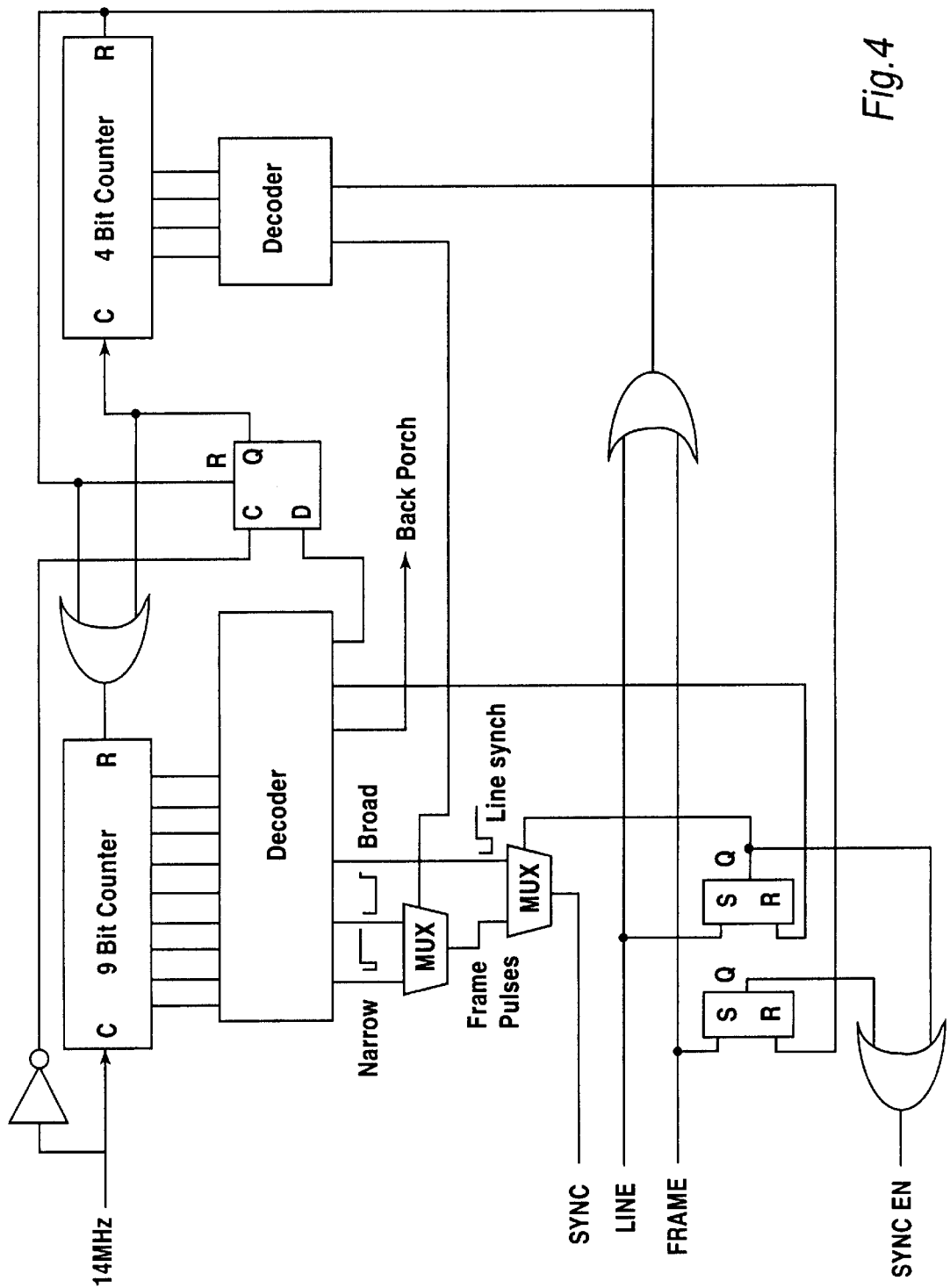
FIG. 4 is a block diagram of one example of a sync generator circuit.
Figure 5:
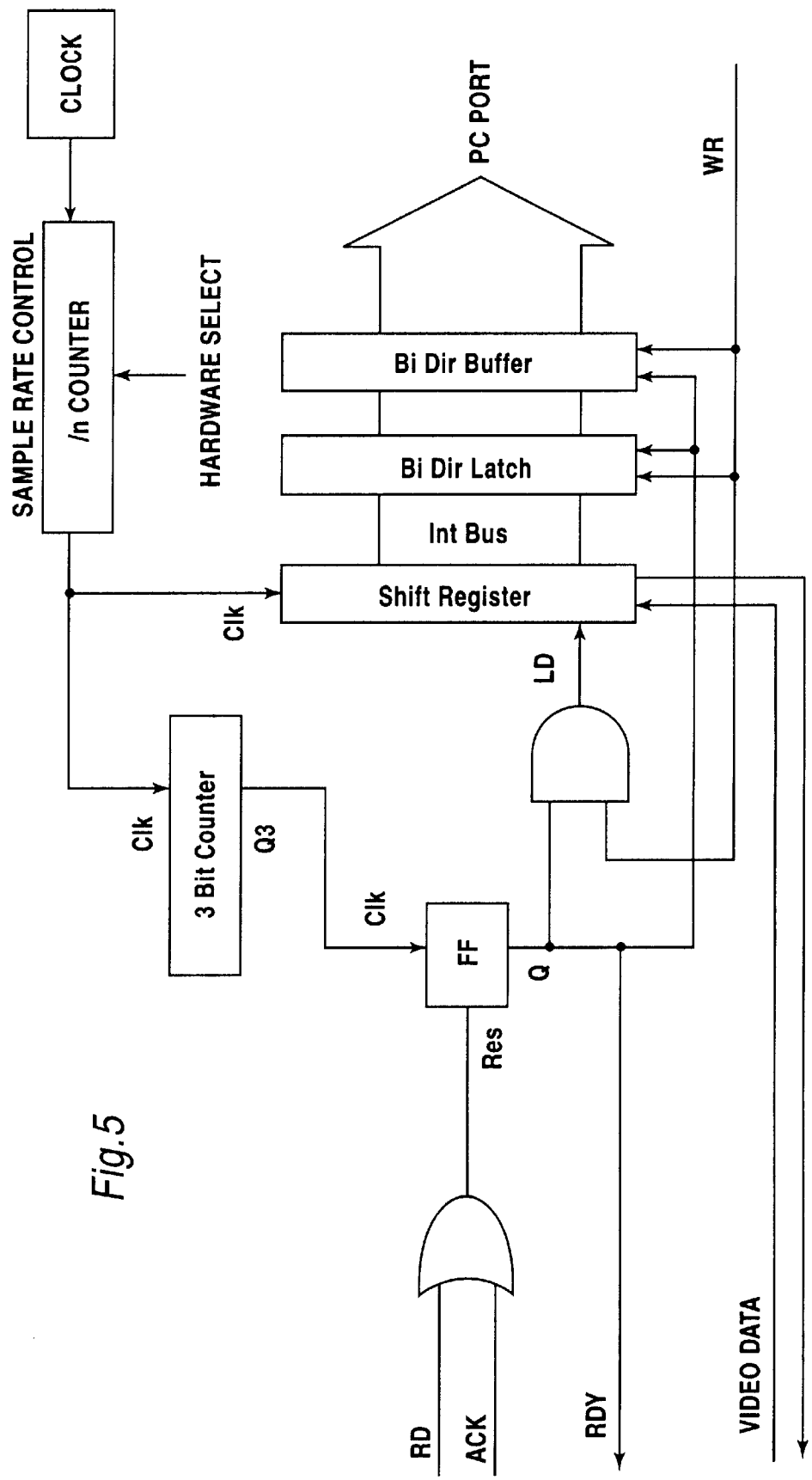
FIG. 5 is a block diagram of one example of a buffer and serial/parallel converter.

Examples of the sync generator 205 and buffer and serial/parallel converter 206 of the video interface card are shown in more detail in FIGS. 4 and 5.

The above described PC backup interface card 2 and associated software allow the PC to be interfaced to a domestic video recorder equipped with, for example, a SCART interface. The PC backup system enables the contents of any or all files on the personal computer hard disk 104 to be stored on and retrieved from a standard video tape. Two PC I/O ports are utilized for the transfer of data (port A) and the control/status of interface card registers (port B). The interface card 2 has the form of a standard PC expansion card.

The PC backup interface card 2 is electrically and physically compatible with the PC ISA standard for peripheral expansion cards. Connection to the video signal is via a SCART type connector on the rear edge of the expansion card accessed through an aperture in a metal end plate. Video impedance and drive preferably conforms to SCART standard EN50-049 (BS 6552:1984), with 75 ohm termination (also known as 'Peri-tel' or 'Euroconnector').

In the switch block 202, jumpers J2–J6 change the I/O port address, and this avoids conflict with other expansion cards. Thirty two selectable address blocks are available from 300H to 31FH, selected in increments of two.

EXAMPLE

J2 J3 J4 J5 J6 Address
off off off off off 300–301H Port A 300H Port B 301H
on off off off off 302–303H Port A 302H Port B 303H
off on off off off 304–305H Port A 304H Port B 305H etc In use of the illustrated back up system, data from the PC is superimposed on a standard video signal, so that the data bits appear on that portion of the video signal where luminance information would normally appear. The rate at which the data is transferred depends upon the rate at which both the PC and the VCR can transmit and store data within acceptable error limits, and the system is adapted to adjust the rate of data transfer in accordance with those characteristics, as mentioned above. In the illustrated embodiment of the invention, the number of bits to be stored in each line of video signal may be selected as either 40 or 88.

A control bit in port B sets the number of bits per line to 40 or 88, by selecting a PC Bus 14.31818 MHz clock or dividing it by two. Data rate at 40 bits per line is 625 Kbit/sec and at 88 bits per line is 1.378 Mbit/sec. The time required to transfer 200 Mbyte of un-coded data is 19.39 minutes or 38.78 minutes (19.39×2) for error correction coded data assuming no compression. The time for interleaved, error coded and compressed data is also 38.78 minutes (19.39×2×2/2).

Figure 6:
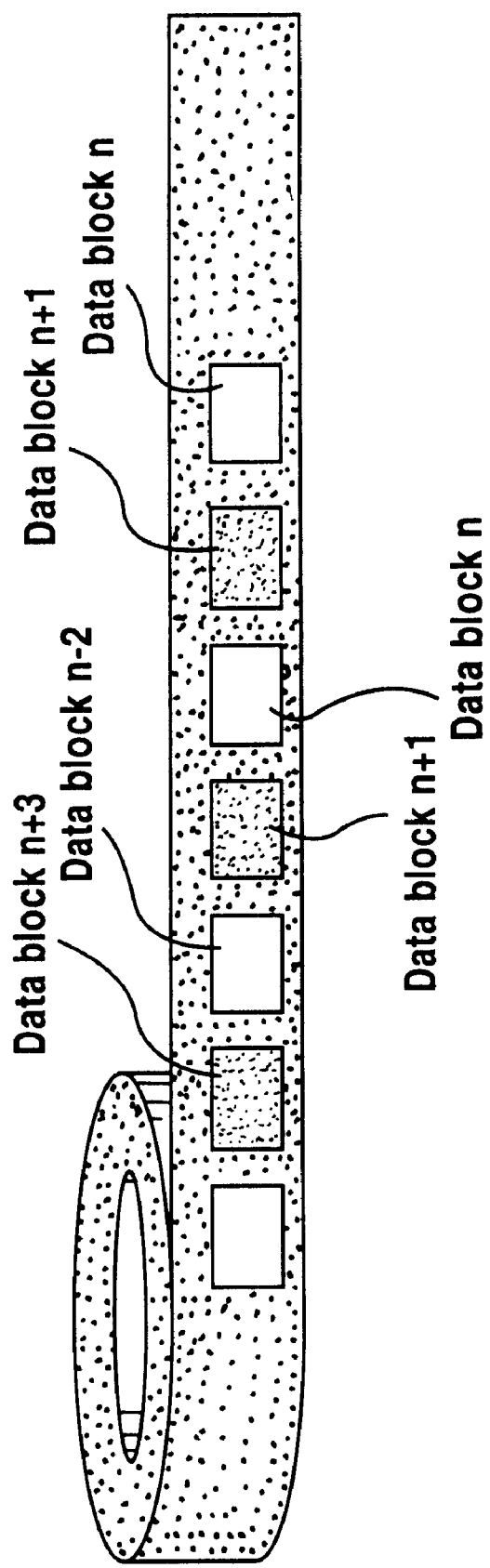
FIG. 6 shows a video tape and illustrates diagrammatically the interleaving of data thereon.

To reduce the effects of drop out on video recording tape, the data may be recorded on the tape in interleaved blocks. This is illustrated diagrammatically in FIG. 6. As may be seen, data blocks n and n+1 are recorded sequentially on the tape, and then repeated. They are then followed by data blocks n+2 and n+3, which are likewise repeated.

Figure 7:
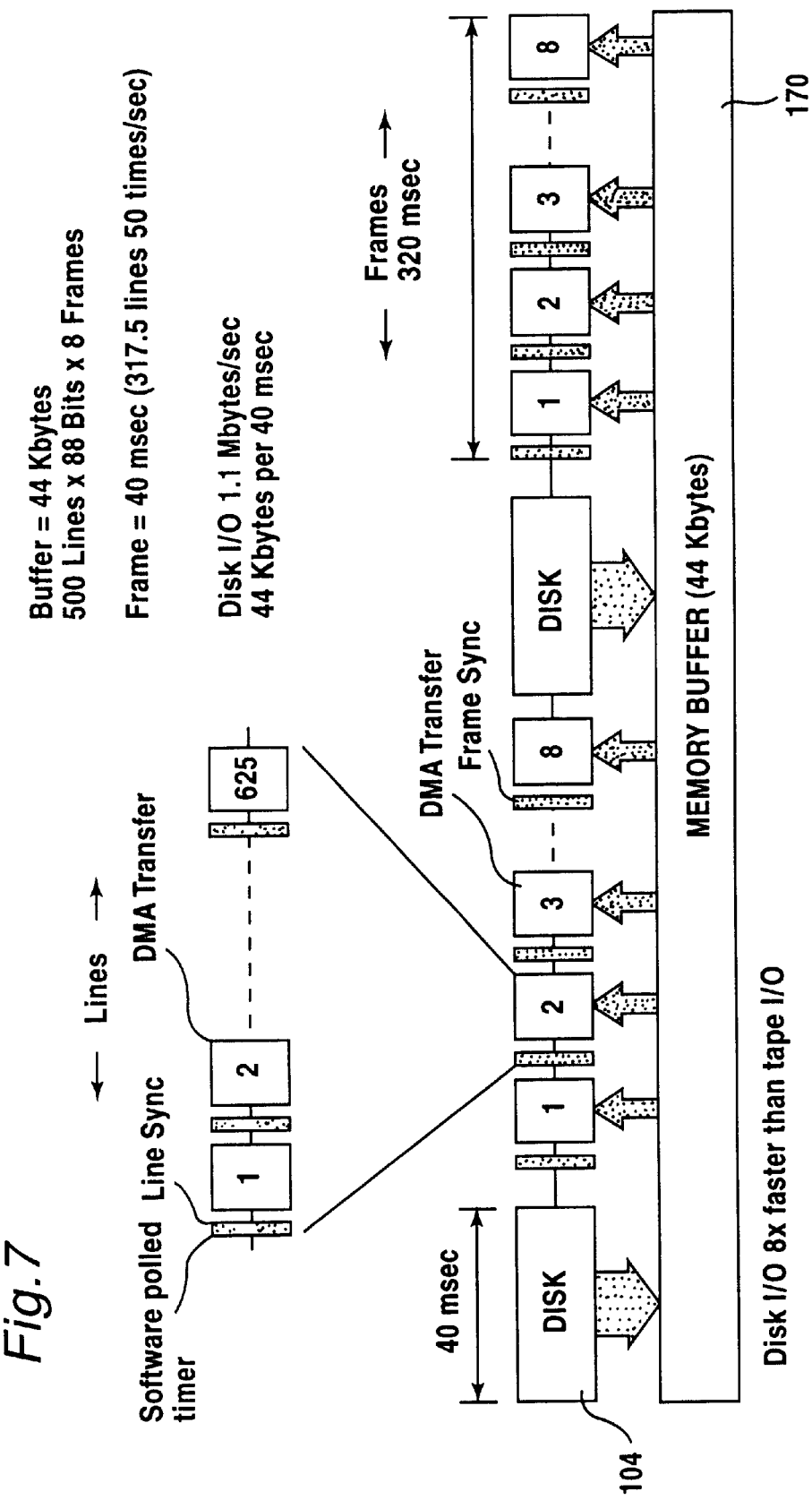
FIG. 7 is a diagram to illustrate in more detail a data interleaving process.

In the example illustrated in FIG. 7, the disk 104 of the PC 1 writes to a memory buffer 120 for 40 msec periods, during each of which it fills the buffer with 44 kB of data. This represents a disk I/O rate of 1.1 MB/sec. The tape I/O rate is 8 times slower than the disk I/O rate. Therefore, between each disk read operation, a write operation from the memory buffer 120 to the tape is carried out, during which 8 frames of data are written, each comprising 500 lines of 88 bits. This takes 320 msec. The memory buffer 120 may comprise part of the internal RAM of the PC 1, and each data write operation to each line of the video signal may be by direct memory access (DMA) transfer. In between each disk read operation of 40 msec, the PC has a period of 320 msec in which it may be employed on other tasks.

The PC preferably interleaves software processes consisting of disk I/O, data processing and interface communication.

Figure 8:
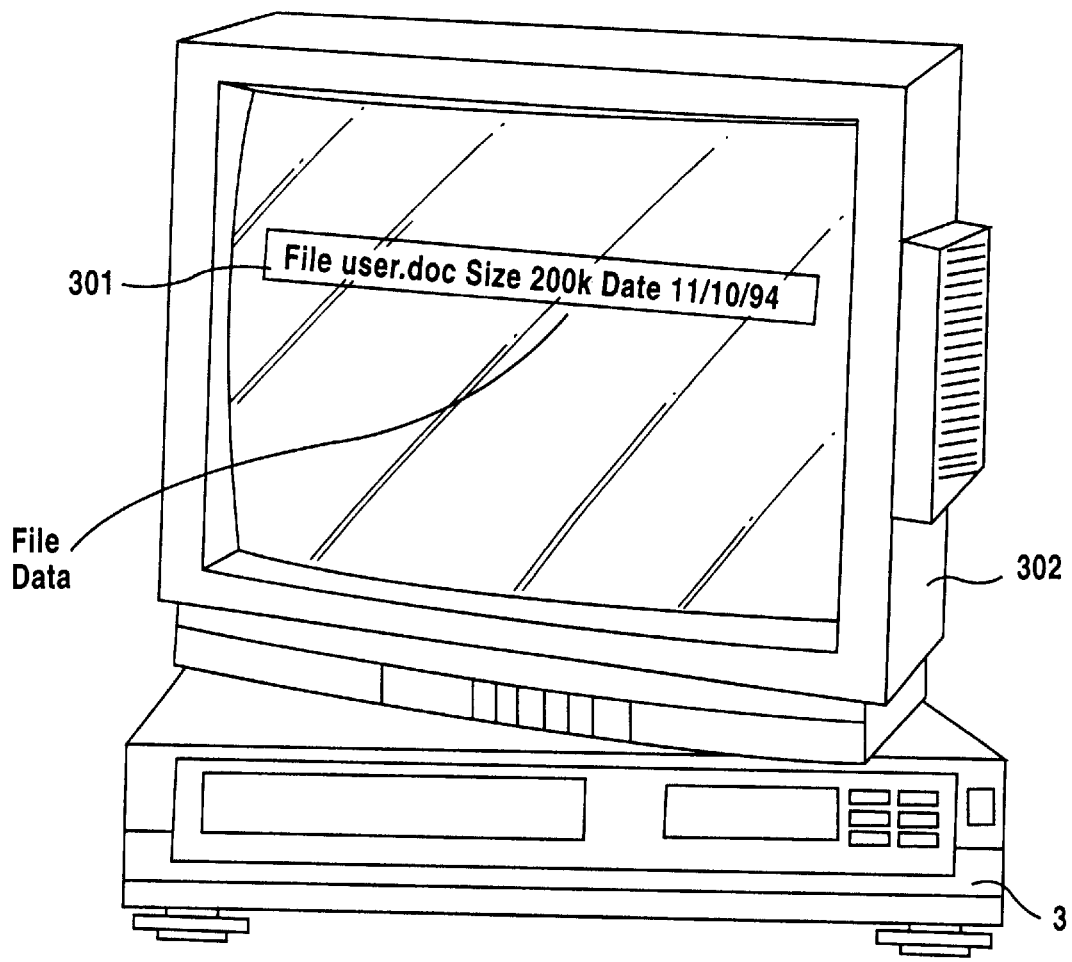
FIG. 8 illustrates a television and VCR with file data display.

Preferably, the data coder/decoder 207 of the video interface 2 decodes file identification data from the PC 1, and encodes it in standard video form to occupy some of the lines of each frame. In this way, when the data is being either written to or read from the tape, a visual display 301 of the file identification data may appear on a monitor 302 (or other display means) associated with the VCR 3, as illustrated in FIG. 8.

Figure 9:
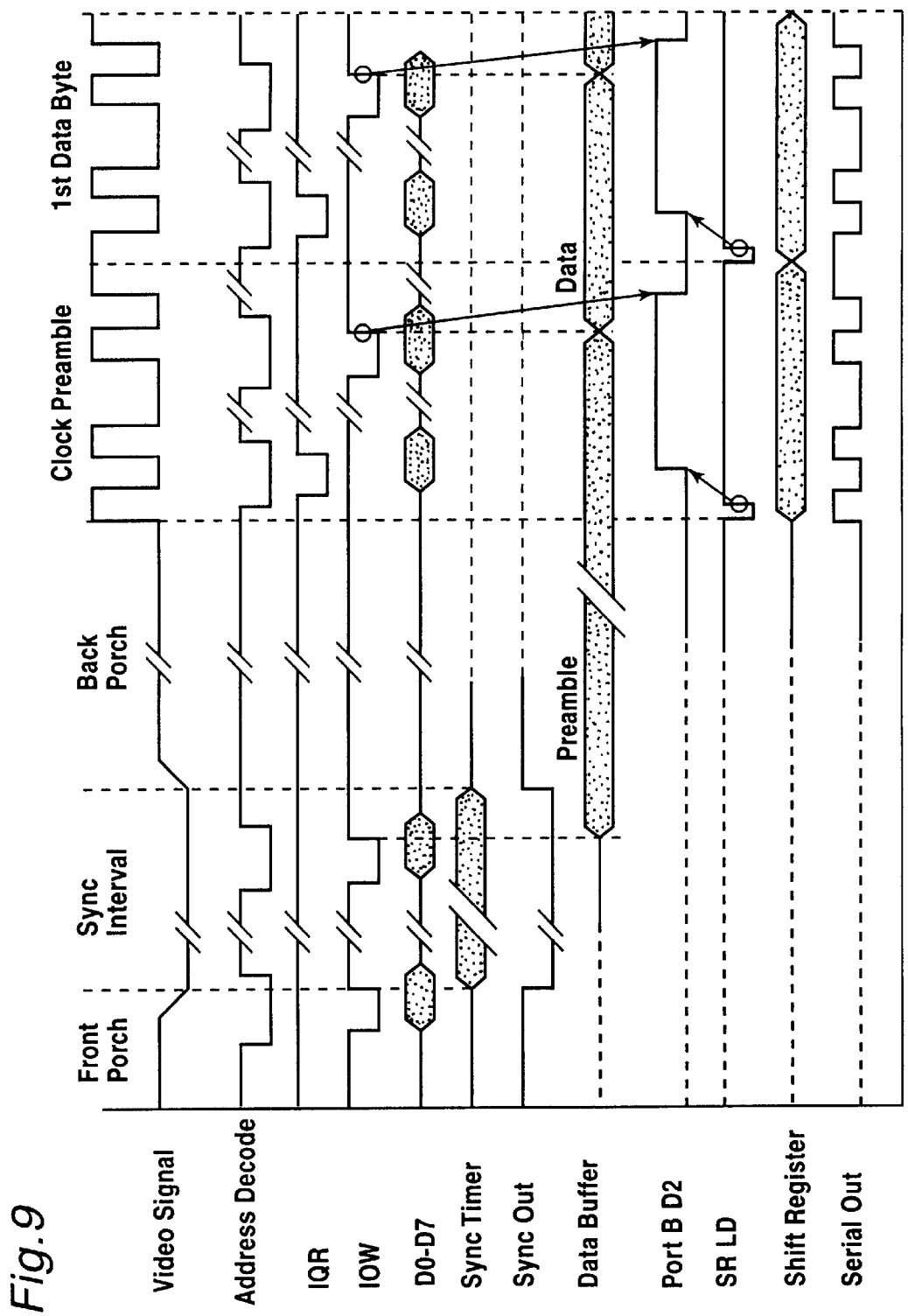
FIG. 9 is a waveform timing diagram illustrating a data writing operation.
Figure 10:
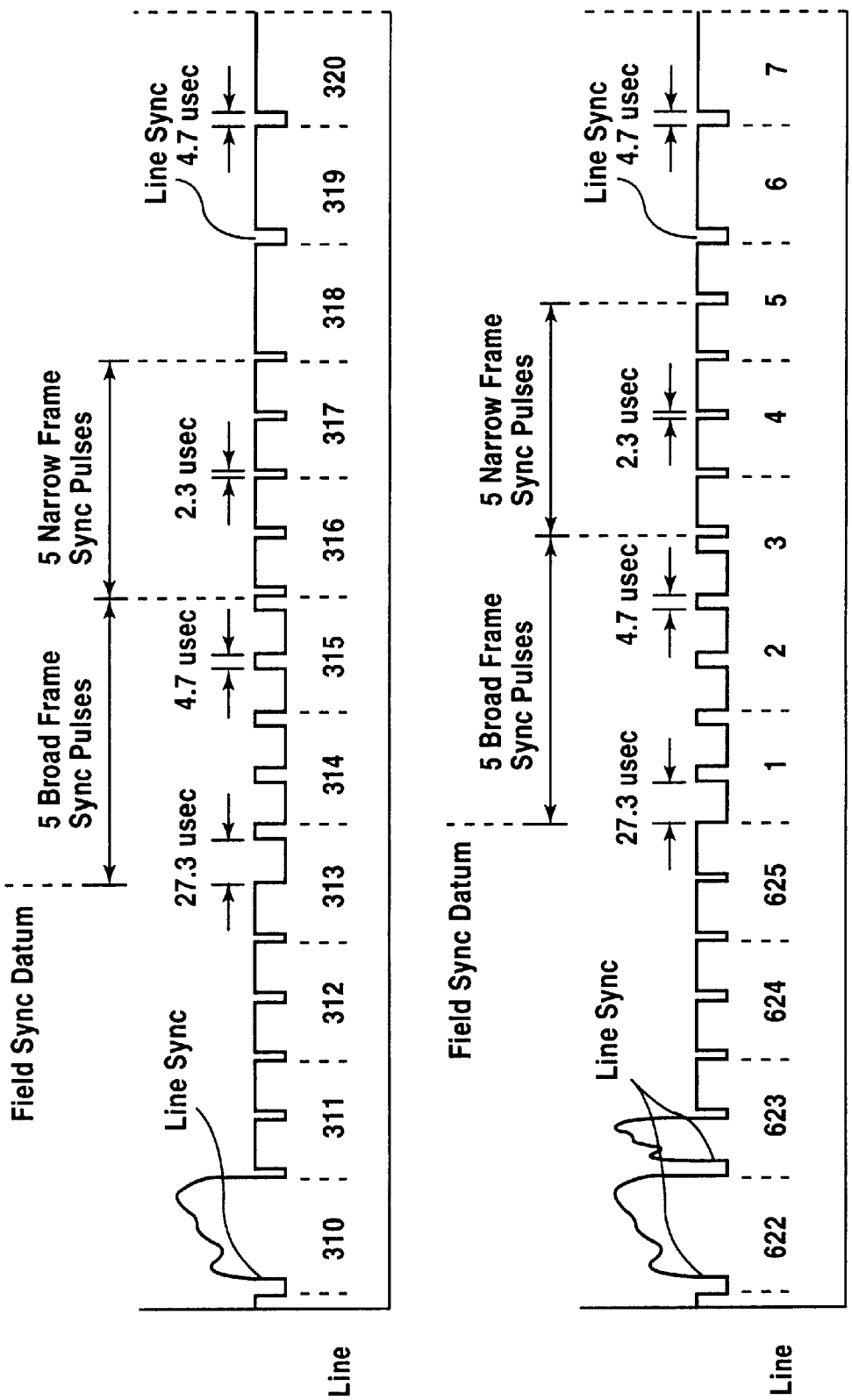
FIG. 10 is a waveform diagram illustrating frame sync pulse generation.

Referring to FIGS. 9 and 10, the interface card 2 is required to generate and detect line sync pulses, each pulse being characterized by a signal level of 0 volts and of 4.7 μs duration +/−0.1 μs.

An eight-bit clock preamble sequence is used to synchronize the sampling clock of an NRZ decoder during playback.

During the back porch period, the PC software will write to port A D0–D7 the clock preamble data byte. Immediately following the back porch period, the eight bit preamble is output in serial form to the video output. A shift register loaded from the internal data buffer could be utilized but, regardless of the method used, the data register must be free to accept a new data byte during serial output. The signal voltage should rise to 1.0 volts for a data 1 and fall to 0.3 volts for a data 0. Each bit interval should be either 0.558 μsec or 1.117 μs depending on the setting of the associated control bit in port B.

During the clock preamble period, the PC software writes a data byte to port A D0–D7. Immediately following the clock preamble, this data is output in serial form, loaded from the internal data buffer. Signal voltages and bit timing will remain at 0.3–1.0 volts (logic 0 & logic 1) and either 0.558 μsec or 1.117 μs depending on the setting of the associated control bit in port B. During serial output of the first data byte, a second data byte will be written to port A by the PC software. This process will continue for either 40 or 88 bits of data depending on the position of the associated control bit in port B. Following the last byte of data for each line there will be a period of at least 1.55 μs where the video signal level will be held at 0.3 volts (the so-called front porch period).

After each byte has been loaded into the shift register, a status flag is set on port B D2, indicating to the PC software that the interface is ready to receive a new data byte. The period between data transfer of each data byte from the PC to the interface card will therefore be 4.47 μs or 8.94 μs (0.558×8 or 1.117×8).

A larger buffer would allow the PC software to send a whole line of video data each time (40 or 88 bits), enabling the software to be engaged in other functions when not sending data. This would be of particular advantage if achieved at zero or little incremental cost; if a microcontroller implementation is utilized, internal RAM could be used as the data buffer.

Referring now to FIG. 10, after 312.5 lines of video, a series of frame sync pulses are required. These pulses consist of five narrow pulses of 2.3 μsec, followed by five broad pulses of 27.3 μsec, followed by another five narrow pulses of 2.3 μsec. When the last pulse has been generated, the PC software initiates a line sync pulse, after which a normal video line follows. The timing tolerance for narrow and broad pulses is +/−0.1 μsec.

At the end of video line 310 the PC software initiates a frame sync pulse by writing a '1' to port B D2. This causes the interface card to generate the series of frame sync pulses. Similarly for the second frame sync, half way through lines 623, the PC software initiates a frame sync by writing a second '1' to port B D2.

Figure 11:
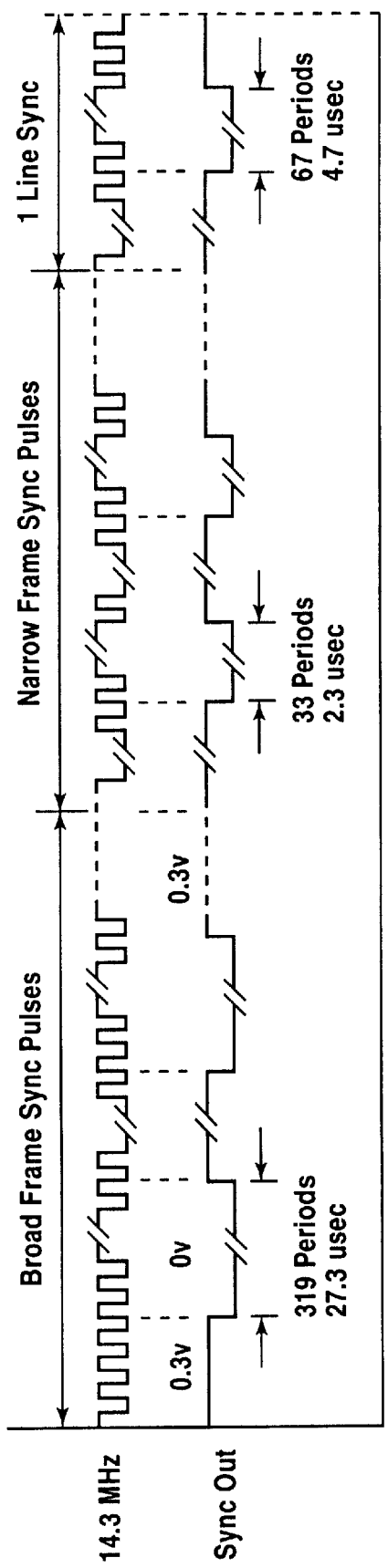
FIG. 11 is a waveform diagram illustrating frame sync pulses.

One possible scheme that can generate the correct timing for the back porch, line sync and frame sync series is illustrated in FIG. 4. Line syncs take 67 periods of the PC Bus 14.3 MHz clock, narrow pulses 33 periods and broad pulses 319 periods, as illustrated in FIG. 11. Two counters and two decoders generate the necessary timing. A signal on 'sync' or 'frame' generates either a single line sync pulse or the series of fifteen frame pulses. In addition, the circuit can also be used to time the back porch period. The two counters could utilize some of the registers that are needed for the NRZ decoder and bit counter.

Alternative schemes could be used that require the PC software to participate in the frame sync process, but present day PCs are unlikely to be able to generate timing with accuracy better than +/−2.5 μsec.

Figure 12:
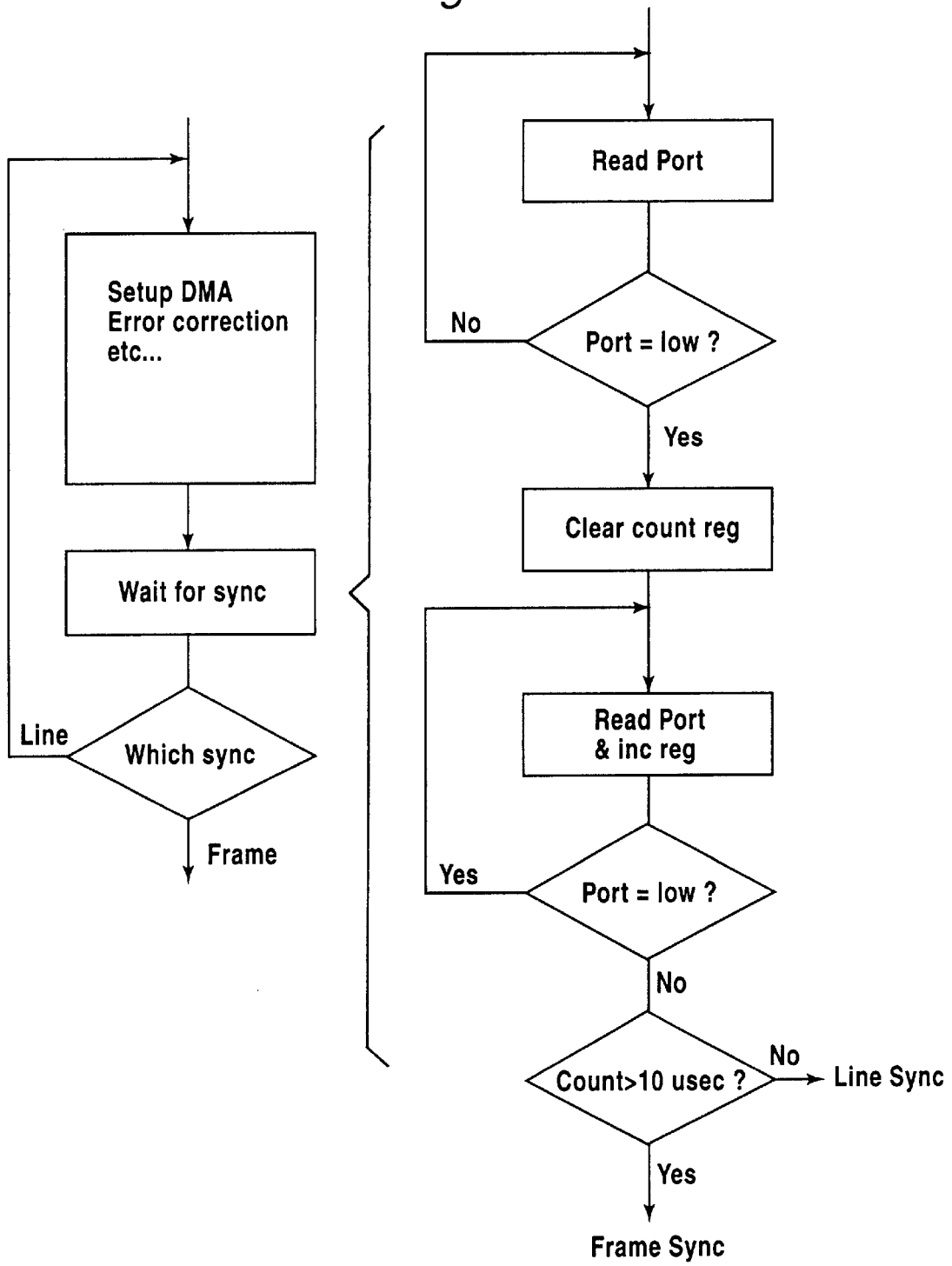
FIG. 12 is a flow diagram illustrating frame sync pulse decoding.

In the example illustrated in FIG. 12, sync decoding of the frame sync is accomplished by the PC software; no additional hardware is required. The PC software simply times the period that a pulse stays low, in order to determine the sync type.

Figure 13:
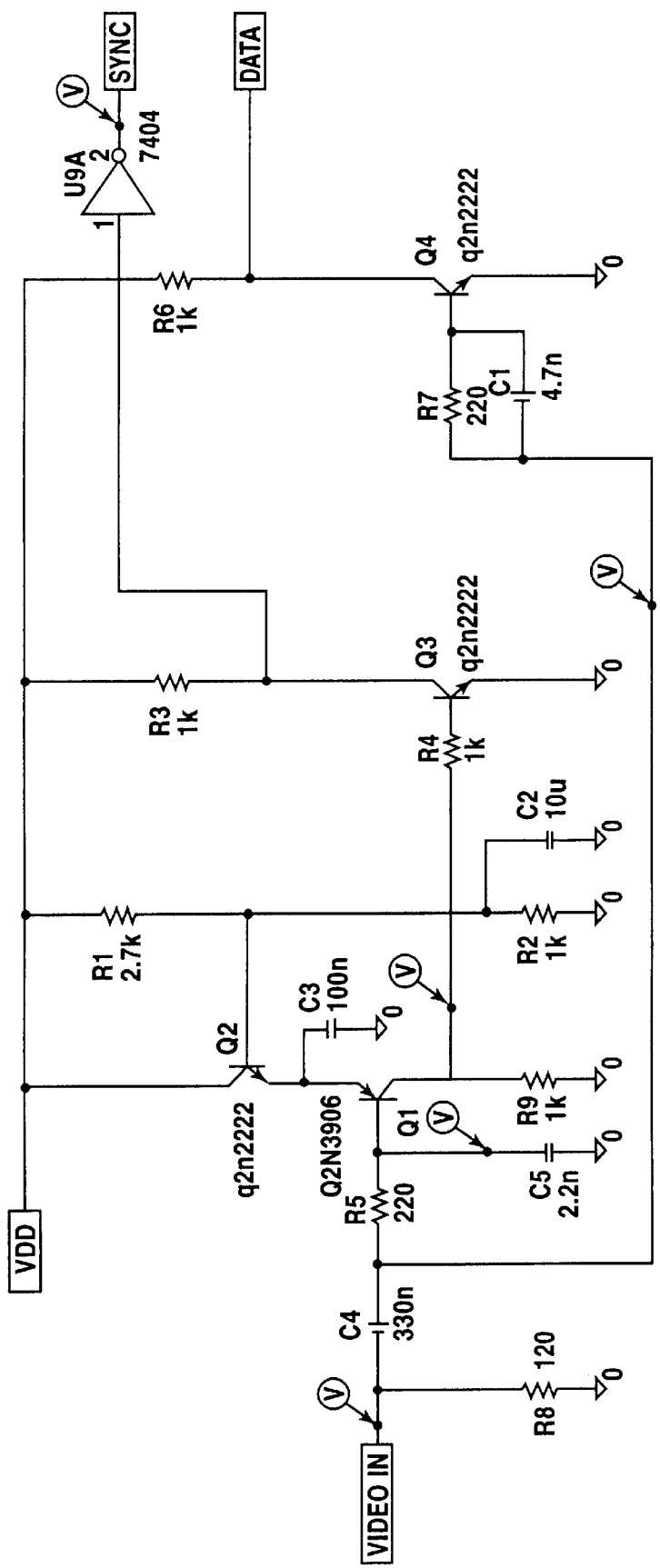
FIG. 13 is a circuit diagram of a sync and data separator.
Figure 14:
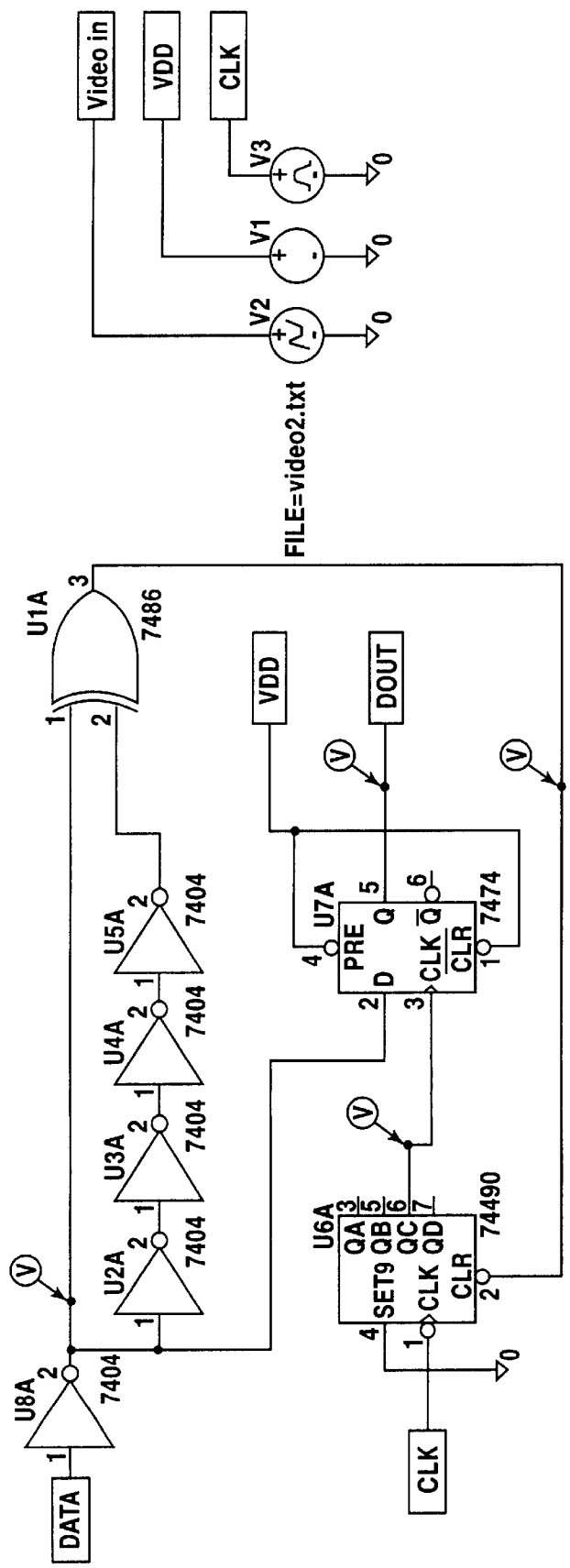
FIG. 14 is a circuit diagram of part of an NRZ decoder.

Referring to FIG. 13, the composite video signal consists of both video and line and frame sync information. Video (luminance) information is represented by signals that range between 0.3 and 1.0 volts. Sync information is coded as pulses of below 0.3 volts.

A simple level detector and single pole low pass RC filter are capable of detecting the falling edge of the start of the sync pulse. As this condition can only legitimately occur during a sync interval it is not necessary to time the received sync period. A simple filter will remove any high frequency noise that may otherwise cause the signal to spuriously pulse low. The status of the sync level detector is available at port B D0. The PC software polls the status of this port, waiting for the start of the line sync interval. Immediately after the PC software has polled an active sync status, it writes to port B D1, setting the internal clock preamble register. When set, the preamble register requires the interface card to look for the clock preamble sequence.

Data is one bit quantised by a second level detector circuit, set at 0.6 volts; again a simple RC filter is sufficient to remove any high frequency noise. The level detector preferably utilizes positive feedback to provide some degree of hysteresis around the 0.6 volt threshold. The output of the data level detector is shifted into an 8 bit shift register (possibly the same register used to generate serial video data), and a decoder connected to the shift register detects whether the clock preamble has been received. On receipt of the clock preamble, the preamble register should be reset, indicating that the next eight bits are valid data. A single clock preamble is used for each line of video data. The preamble also serves to synchronize the data sampling interval of the NRZ decoder, ready for the first byte of data.

Figure 15:
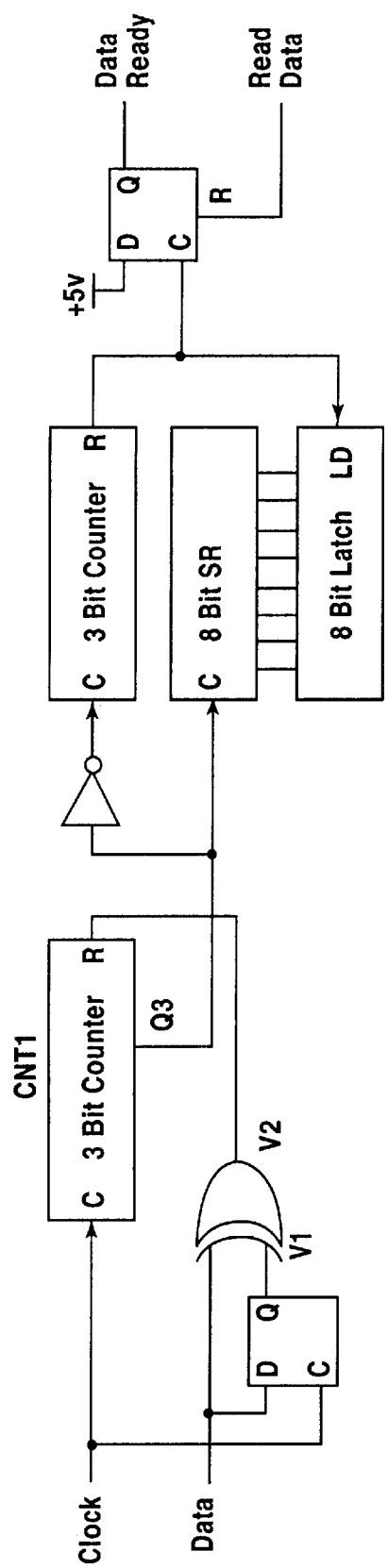
FIG. 15 is a circuit diagram of an NRZ decoder.
Figure 16:
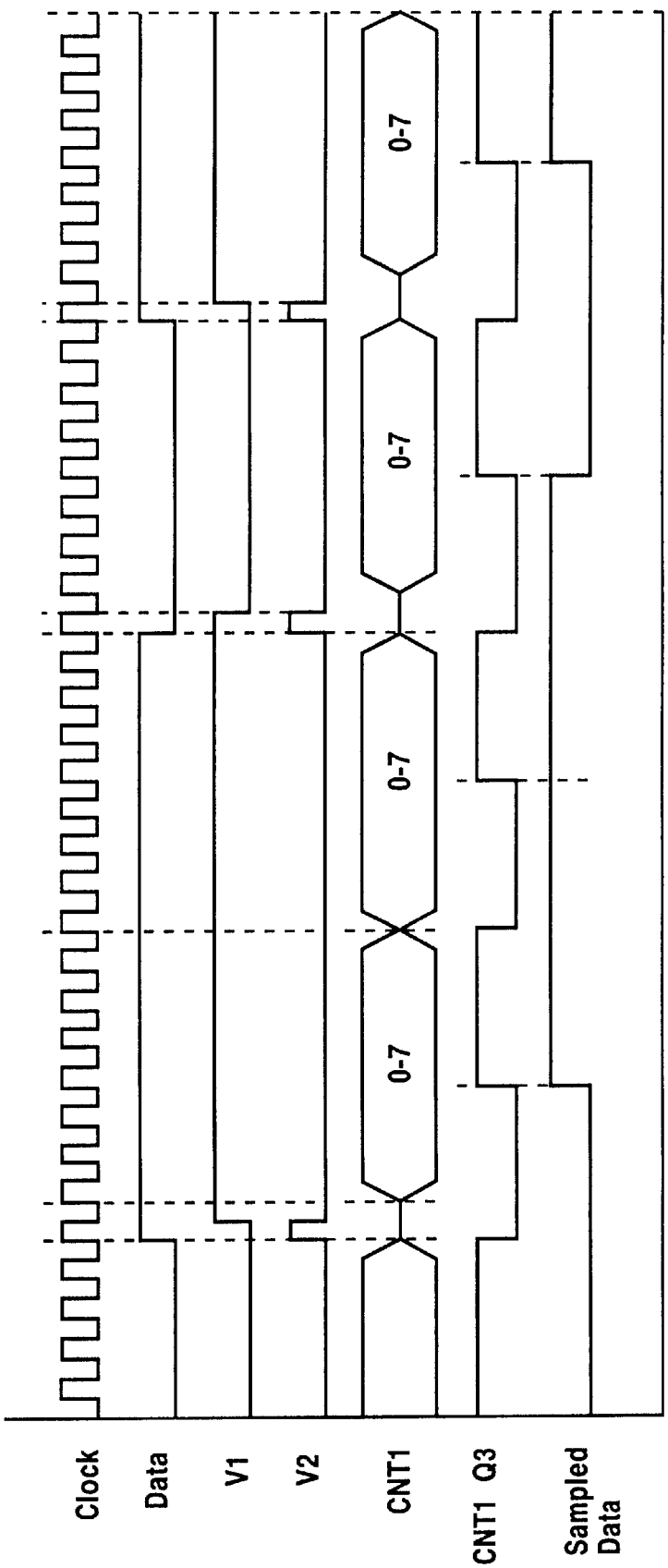
FIG. 16 is a waveform timing diagram illustrating operation of the NRZ decoder.

As shown in FIGS. 15 and 16, the NRZ decoder consists of an XOR gate, a delay stage and a 3-bit resettable counter. The clock for the shift register is derived from the rising edge of the last output of the counter. Each data edge is detected (by an XOR gate and a delay stage) and used to reset the counter. The counter is clocked at 14.31818 MHz (PC Bus) or 7.15909 MHz (PC Bus divide by 2) depending on the setting of the control bit in port B. The size of this counter is selected to ensure that the shift register will sample the data level detector half way through each bit interval. The counter is capable of continuing to correctly time half way through a data interval even if a series of edgeless data is received (all 1's or all 0's), as the counter will normally cycle back to a count of zero at the time that a data edge would normally be detected.

After eight bits have been received they are transferred to a buffer (size>=1 byte) and the status of port B D1 is forced high to indicate to the PC software that it should read the buffer. This process continues until all of the data for the current line has been decoded and transferred (40 or 88 bits)

Figure 17:
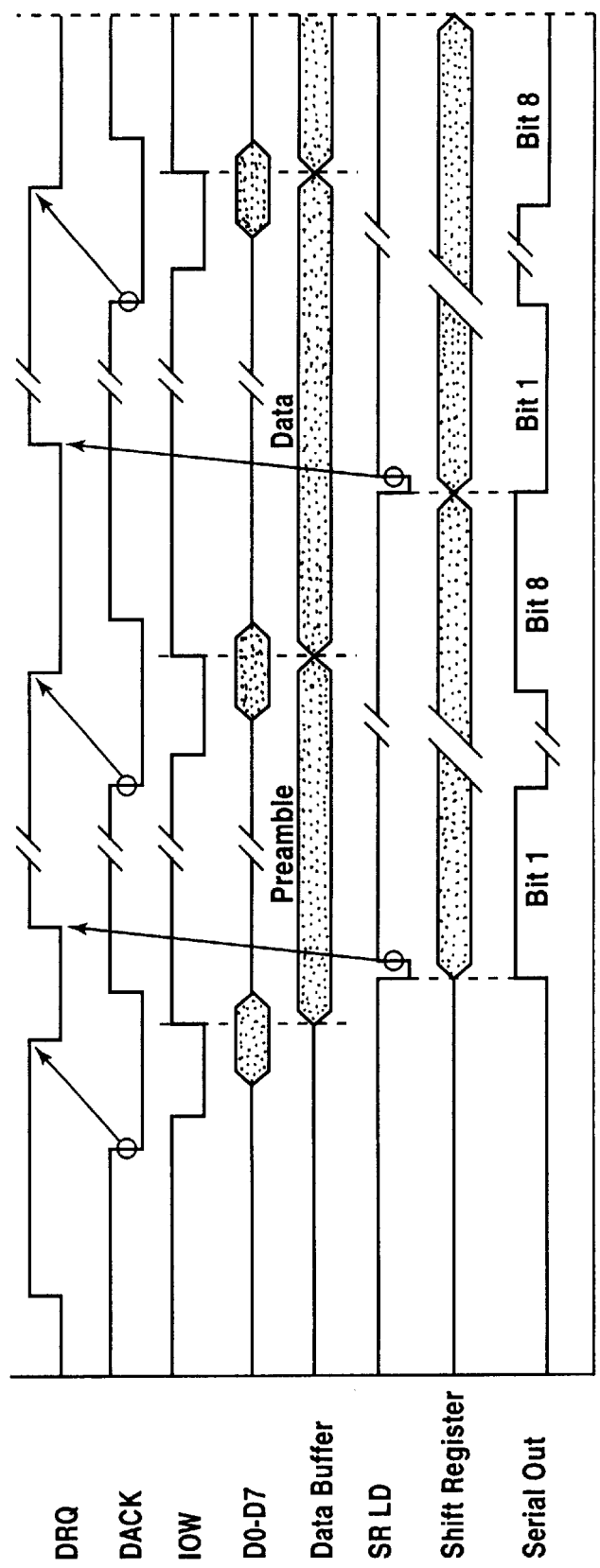
FIG. 17 is a waveform timing diagram illustrating a data transfer operation utilising DMA (direct memory access)

In a preferred option, data transfer between the interface card and the PC could be accomplished under control of the PC DMA (direct memory access) controller. This technique would free the PC microprocessor to deal more efficiently with disk I/O and error correction. However, this technique does require additional logic to generate and interpret control signals DRQ and DACK, as illustrated in FIG. 17.

The PC software still generates a sync initiation signal, writing a data '1' to the control port (port B D0). However data transfer is controlled by the interface card generating a DMA request (DRQ), initially for the clock preamble and subsequently for data. On receiving the DRQ, the DMA controller takes control of the PC bus, generates a DACK signal and places data from the PC memory onto the bus. On receiving the DACK signal, the interface card cancels the DRQ signal. Transfer of data from the PC bus to the data buffer is initiated on the rising edge of PC bus signal IOW. As with the software polled technique, this data is loaded into a shift register for serial output.

After loading the shift register from the data register, a new DRQ signal is initiated. This is used by the DMA controller to place another data byte onto the PC bus. This byte is then loaded into the interface data buffer for subsequent loading into the shift register. This process continues until all of the data for one line of video has been transferred. The PC software re-initializes the DMA controller for transfer of a new line of video data and sets up the PC counter/timer for generating the correct timing interval (64 $\mu$s) between subsequent lines of video. The PC software then re-initiates a line sync signal (port B D0).

Reading the interface card and transferring data to the PC memory requires a similar sequence of events. The PC software looks for a line sync signal on port B D0, the PC software then writes to port B D1, setting the internal clock preamble register. On receipt of the clock preamble, the preamble register is reset indicating that the next eight bits are valid data. This data is shifted into a shift register and, after eight bits have been received, the data byte is transferred to the data register. On transfer, the interface card generates a DRQ signal, and the DMA controller takes control of the PC bus and generates a DACK signal.

On receipt of the DACK signal, the interface card cancels the DRQ signal and while the IOR signal is low, places the data byte onto the PC bus. On the rising edge of the IOR signal the DMA controller transfers the data byte to PC memory. This process is repeated for the whole line of video data. The PC software then re-initializes the DMA controller and waits for the sync active signal (port B D0) for the next line of video data. Preferably, the interface is configured to accept multiple frames of video data from the DMA controller by configuring the interface 2 to initiate its own line sync and data preamble using timer circuit 203.

Any of the designated bit positions for control and status bits may be changed to suit the particular implementation, but preferably these signals should be present in the same status byte.

An important feature of the preferred embodiments of the invention is that each physical line or group of physical lines that form a logical line of data preferably comprises a preamble word to identify the beginning of a new line, and a beginning and end marker to indicate a line count. FIG. 18 illustrates one example of code sequences that implement such a feature. The interface 2 knows to expect a certain number of bits between the beginning and end markers of each line. Should any bits be missing, the data is replaced with a string of zeros. The string of zeros indicates to the error correction system where the error occurs, and this can then be corrected by standard error correction techniques (eg Reed-Solomon) to restore the missing data. By operating in this way, the back up system can tolerate a certain loss of data if the PC 1 and interface 2 do not operate at the same speed. This means that the system can operate at the maximum possible speed at which a modest loss of data can be tolerated, which is sufficiently low as to be capable of correction by error correction techniques.

Although in the above example the interface is described in terms of a standard PC expansion card, it is to be appreciated that it may be provided in any other convenient manner. For example, it may be in the form of a "dongle" on a printer port of the PC 1.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A data transfer system for transferring data between a computer and a video recorder/player, the system comprising:

generating means for generating a video signal;

coding means for coding data received from the computer;

mixing means for mixing such coded data with said video signal to carry said data on said video signal;

separating means for separating coded data from a video signal received from the video recorder/player;

decoding means for decoding data separated by said separating means;

set-able timing means for controlling the rate of transfer of data between the computer and the video recorder/player; and first ranging means for assessing data transfer rate and associated error characteristics of a video recorder/player including at least errors relating to lost portions or whole lines of video, and providing a control signal or data to said timing means;

whereby the signal from the first ranging means is used to control the set-able timing means.

2. The system according to claim 1, wherein at least part of said generating means, coding means, mixing means, separating means, decoding means and timing means are embodied as an interface device for cooperation with the computer.

3. The system according to claim 2, wherein said interface device comprises a PC expansion card.

4. The system according to claim 1, including second ranging means for assessing data transfer rate and associated error characteristics of the computer, and providing a control signal or data to said timing means.

5. The system according to claim 4, wherein said second ranging means is arranged to assess CPU performance, available static memory, disk capacity and disk I/O bandwidth of the computer.

6. The system according to claim 4 wherein at least part of said first and/or second ranging means is embodied by way of a program within said computer.

7. The system according to claim 1 wherein:

for the data carried on said video signal, a predetermined number of data bits are carried on each of a plurality of lines of video signal;

each line carries additional markers to identify each video line individually; and when decoding the video signal, missing data bits on a line are replaced by a predetermined sequence of bits, and each said sequence of bits is detected by an error detector and reconstituted by the original bits by an error correction process.

8. The system according to claim 7, wherein said predetermined sequence of bits comprises a string of zero's or a string of one's.

9. The system according to claim 1, wherein said decoding means comprises a counter which is reset by each transition edge of incoming data and provides a count signal after one-half of the duration of one data bit and thereafter at a period equal to the duration of one bit until being reset, the count signal being used to detect a current data bit.

10. The system according to claim 1, including means for generating a display signal to display identification data of a current file of which the data is being transferred between the computer and the video recorder/player.

11. In combination, a computer and/or a video recorder/player together with a data transfer system according to claim 1.

12. A combination according to claim 11, wherein the data transfer system is arranged to back up data from a hard disk of the computer to the video recorder/player, and to restore data from the video recorder/player to the hard disk of the computer.

* * * * *